L. M. SCHMIDT.
ELECTRIC VALVE.
APPLICATION FILED MAY 6, 1909.
959,618.
Patented May 31, 1910.
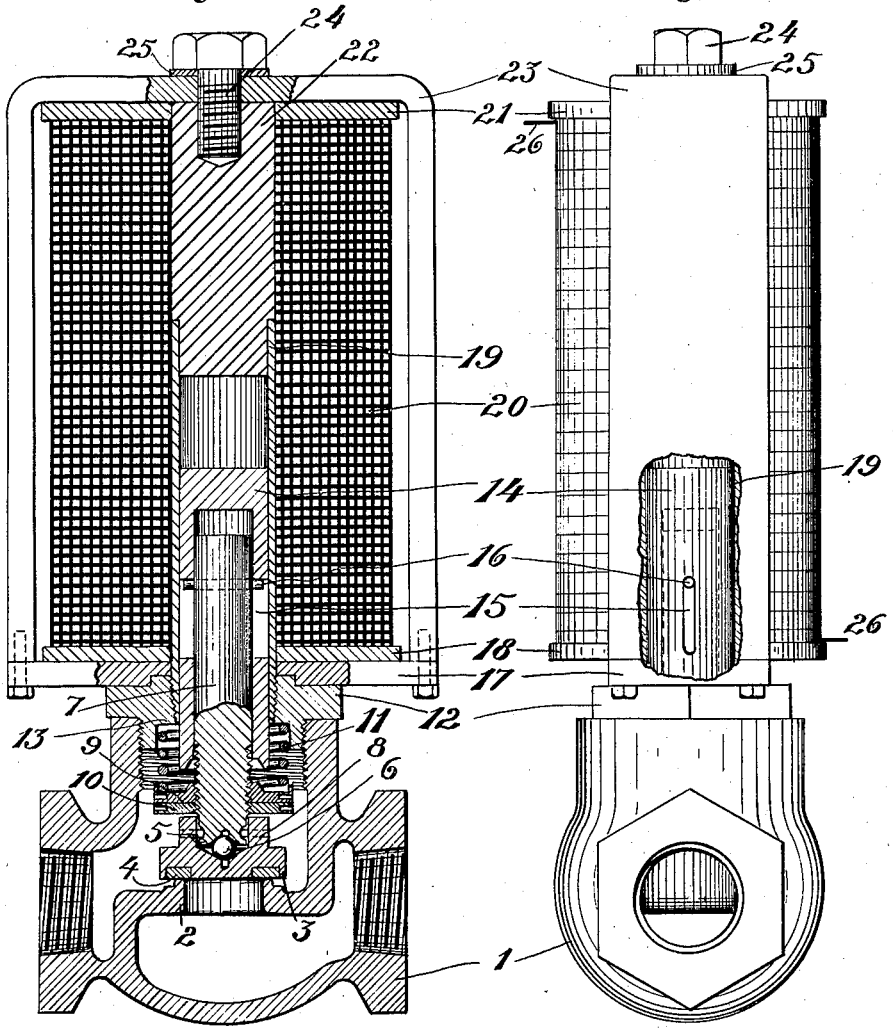
Fig: 1
Fig: 2
Fig: 3
Fig: 4
Witnesses
A. C. Culver.
J. R. Martin.
Inventor
Louis M. Schmidt
By George P. Carroll
Attorney

UNITED STATES PATENT OFFICE.

LOUIS M. SCHMIDT, OF NEW BRITAIN, CONNECTICUT, ASSIGNOR TO GEORGE P. CARROLL, OF BRIDGEPORT, CONNECTICUT.

ELECTRIC VALVE.

959,618.  Specification of Letters Patent.  Patented May 31, 1910.

Application filed May 6, 1909. Serial No. 494,391.

*To all whom it may concern:*

Be it known that I, LOUIS M. SCHMIDT, a citizen of the United States, residing at New Britain, Hartford county, State of Connecticut, have invented a new and useful Electric Valve, of which the following is a specification.

My invention relates to electrically actuated valves and consists of means for opening and closing a valve without the intervention of any moving part extending from the outside of the valve chamber to the valve within the chamber. It thus avoids on the one hand the possibility of leakage through a loose stuffing box and on the other hand the loss of power occurring from a tight stuffing box. The means employed are as will appear.

In the drawings Figure 1 is a partial vertical section and a partial front elevation of my invention. Fig. 2 is a right side elevation of the same structure, partially broken away. Fig. 3 is a plan of a valve disk. Fig. 4 is a side elevation of the same disk.

A valve body 1, preferably of brass, has midway between its ends a flat horizontal valve seat 2, having a circular rim at its top. A valve disk 3 has inserted on its under side a babbitt ring 4 so that when the disk is seated the babbitt ring fits closely upon the rim of the seat and closes the passageway through the body. In the center of the top of the disk is a circular pocket 5, concave at the bottom so as to hold a ball 6 at the exact center of the disk. The top of the disk thus forms a rim around the pocket. A stem 7 has a central concavity at its lower end so as to fit over the ball 6 and is secured to the disk 3 by a pin 8 passing through the rim at its top and through the stem. There is a sufficient play of the stem about the pin and over the ball so that, as the stem is thrust down, the disk is seated perfectly flat even although the stem may not be in precise axial alinement with the disk.

Just above the disk 3 the stem 7 is threaded for the support of an adjustable internally threaded cup disk 9, kept in any desired position by a lock nut 10. A coiled spring 11 surrounds the stem and abuts at its lower end within the disk 9. An externally and internally threaded nut 12, having a flange above its outside thread, is screwed into the internally threaded top of the body 1 outside of the spring 11 so that its flange covers the top of the body. The nut just below its internal thread has a shoulder 13 against which the upper end of the spring abuts. The spring 11, acting through the disk 9, the stem 7 and the ball 6, thus constantly tends and normally is effective to seat the disk 3 upon the seat 2. When the disk 3 is so seated there is a considerable distance between the disk 9 and the bottom of the nut 12; but when the disk 9 is lifted and the spring 11 is compressed, this distance is diminished.

A core 14 has a hollow bore, extending from its lower end up to near its top, and is slotted on both sides at 15. These slots are about equidistant from the ends of the core. The upper part of the stem 7 loosely fits in the bore of the core and is transversely pierced near its top by a pin 16 extending at each end into the slots 15. When the core is unmagnetized the pin is in the top of the slots and supports the core as shown.

A plate 17 fits over a hub on the top of the nut 12 and supports a disk 18. A thin tube 19 is externally threaded at its lower end and is passed through the plate 17, and into the internal thread of the nut 12. Surrounding the tube 19 and supported by the disk 18 is a solenoid coil 20 of insulated copper wire. A centrally perforated disk 21 covers the top of the coil. A plug 22 passes through the disk and the upper half of the coil 20; and at its lower end, where it is of slightly less diameter, it tightly fits within the top of the tube 19. A yoke 23 fits over the plug 22 and the disk 21 and has its lower ends firmly bolted to the plate 17. A bolt 24 passes through a washer 25 and the center of the top of the yoke 23 into the plug 22 so as to hold it at the top of the tube 19. A wire 26 leads to and from the coil 20.

The parts 8 and 16 preferably are made of any steel suitable for pins and the part 11 preferably is made of any steel suitable for springs. The ball 6 preferably is of hard steel. The tube 19 preferably is made of brass and the disks 18 and 21 of wood fiber or hard rubber. The parts 3, 7, 9, 10, 12, 17, 22, 23, 24 and 25 are preferably made of low carbon steel.

The method of operation is as follows: The parts being in the normal position as shown, the thrust of the spring 11 is holding the disk 3 upon its seat 2 so as to prevent any passage through the body 1. When a sufficient electric current is passed through the wire 26 and the coil 20, the consequent lines of magnetic force pass through the plug 22, the yoke 23, the plate 17 and the minor magnetizable parts in the same pathway so as to quickly pull the core 14 upward the plug 22. In its ascent the lower ends of the slot 15 come in contact with the pin 16, delivering a hammer blow. The effect on the pin is to lift the stem 7, the disk 9 and the pin 8 so as to raise the disk 3 from off its seat 2, and also to compress the spring 11. The valve is now open and remains open as long as a sufficient current passes through the solenoid coil to counterbalance the thrusting force of the spring. But when the current ceases the spring reseats the disk 3 and the valve is closed.

It will be noted that the nut 12, the tube 19 and the plug 22 all form parts of the top wall of the valve chamber and that the wall of the chamber is imperforate except at the ends.

As above described my invention can be used to control the transmission of ordinary fluids. Such a use exists where the valve controls the service pipe supplying gas for the heating of the still of an intermittent absorption refrigerating machine, or for the heating of the coil of an instantaneous water heater.

I claim:

1. In combination a solenoid winding, a valve chamber having a valve seat and having an imperforate part of its wall within said winding, a valve within said chamber adapted first to be positioned in one position in relation to said seat and then in another position in relation to said seat, and a magnetizable core secured to said valve and adapted to reciprocate within the part of said chamber within said winding.

2. In combination a solenoid winding, a valve chamber having a valve seat and having an imperforate part of its wall within said winding, a valve within said chamber initially positioned in one position in relation to said seat, and a magnetizable core secured to said valve and operating upon the passage of a current through said winding to move within the part of said chamber within said winding and to position said valve in the other of its positions.

3. In combination a solenoid winding, a valve chamber having a valve seat and having an imperforate part of its wall within said winding, a valve within said chamber adapted first to be positioned in one position in relation to said seat and then in another position in relation to said seat, a spring tending to position said valve in one of its positions, and a magnetizable core secured to said valve and operating upon the passage of a current through said winding to move within the part of said chamber within said winding, to overcome the tendency of said spring and to position said valve in the other of its positions.

4. In combination a solenoid winding, a valve chamber having a valve seat and having an imperforate part of its wall within said winding, a valve within said chamber initially closing said seat, and a magnetizable core secured to said valve and operating upon the passage of a current through said winding to move within the part of said chamber within said winding and to open said valve.

5. In combination a solenoid winding, a valve chamber having a valve seat and having an imperforate part of its wall within said winding, a valve within said chamber adapted to open or to close said seat, a spring tending to close said valve, and a magnetizable core secured to said valve and operating upon the passage of a current through said winding to move within the part of said chamber within said winding, to overcome the tendency of said spring and to open said valve.

6. In combination a valve chamber having a valve seat, a valve within said chamber adapted to open or to close said seat, a stem wholly within said chamber and operatively connected with said valve, a magnetizable core within said chamber, bored and slotted and adapted for the reciprocation therein of the upper end of said stem, a pin passing through said stem and extending into the slotted part of said core, and an electric device operating when energized to lift said core until said pin strikes the lower end of the slotted part of said core and then to lift said core and stem so as to open said valve.

7. In combination a valve chamber having a valve seat, a valve within said chamber adapted to open or to close said seat, a stem wholly within said chamber and operatively connected with said valve, a magnetizable core within said chamber, bored and slotted and adapted for the reciprocation therein of the upper end of said stem, a pin passing through said stem and extending into the slotted part of said core, an electric device operating when energized to lift said core until said pin strikes the lower end of the slotted part of said core and then to lift said core and stem so as to open said valve, and means for subsequently closing said valve.

8. In combination a valve chamber having a valve seat, a valve within said chamber adapted to open or to close said seat, a stem wholly within said chamber and operatively connected with said valve, a magnetizable core within said chamber, bored and slotted and adapted for the reciprocation therein of the upper end of said stem, a pin passing through said stem and extending into the slotted part of said core, an electric device operating when energized to lift said core until said pin strikes the lower end of the slotted part of said core and then to lift said core and stem so as to open said valve, and means operating upon the cessation of such energization to close said valve.

9. In combination a valve chamber having a valve seat, a valve within said chamber normally closing said seat, a stem wholly within said chamber and operatively connected with said valve, a magnetizable core within said chamber, bored and slotted and adapted for the reciprocation therein of the upper end of said stem, a pin passing through said stem and extending into the slotted part of said core, and an electric device operating while energized to lift said core until said pin strikes the lower end of the slotted part of said core, then to lift said core and stem so as to open said valve and to keep open said valve.

10. In combination a valve chamber having a valve seat, a valve within said chamber adapted to open or to close said seat, a spring tending and normally operating to close said valve upon its seat, a stem wholly within said chamber and operatively connected with said valve, a magnetizable core within said chamber, bored and slotted and adapted for the reciprocation therein of the upper end of said stem, a pin passing through said stem and extending through the slotted part of said core, and an electric device operating while energized to lift said core until said pin strikes the lower end of the slotted part of said core, then to lift said core and stem so as to compress said spring and to open and to keep open said valve.

11. In combination a valve chamber having a valve seat, a valve within said chamber adapted to open or to close said seat and having a pocket at its top and axial center, a ball resting in said pocket, a stem axially resting on said ball and loosely secured to said valve, a magnetizable core within said chamber and operatively connected with said stem, and an electric device operating when energized to act on said core and stem so as to open said valve.

12. In combination a valve chamber having a valve seat, a valve within said chamber adapted to open or to close said seat and having a pocket at its top and axial center, a ball resting in said pocket, a stem axially resting on said ball and loosely secured to said valve, a magnetizable core within said chamber and operatively connected with said stem, an electric device operating when energized to act on said core and stem so as to open said valve, and means for subsequently closing said valve.

13. In combination a valve chamber having a valve seat, a valve within said chamber adapted to open or to close said seat and having a pocket at its top and axial center, a ball resting in said pocket, a stem axially resting on said ball and loosely secured to said valve, a magnetizable core within said chamber and operatively connected with said stem, an electric device operating when energized to act on said core and stem so as to open said valve, and means operating upon the cessation of such energization to close said valve.

14. In combination a valve chamber having a valve seat, a valve within said chamber normally closing said seat and having a pocket at its top and axial center, a ball resting in said pocket, a stem axially resting on said ball and loosely secured to said valve, a magnetizable core within said chamber and operatively connected with said stem, and an electric device operating while energized to act on said core and stem so as to open and to keep open said valve.

15. In combination a valve chamber having a valve seat, a valve within said chamber adapted to open or to close said seat and having a pocket at its top and axial center, a spring tending and normally operating to close said valve upon its seat, a ball resting in said pocket, a stem axially resting on said ball and loosely secured to said valve, a magnetizable core within said chamber and operatively connected with said stem, and an electric device operating while energized to act on said core and stem so as to compress said spring and to open and to keep open said valve.

LOUIS M. SCHMIDT.

Witnesses:
SHEFFIELD H. CLARKE,
N. L. LOCKWOOD.